United States Patent
Wentworth et al.

(10) Patent No.: US 8,938,932 B1
(45) Date of Patent: Jan. 27, 2015

(54) RAIL-LESS ROOF MOUNTING SYSTEM

(71) Applicant: Quality Product LLC, Walnut Creek, CA (US)

(72) Inventors: Stuart Wentworth, Alamo, CA (US); Claudia Wentworth, Alamo, CA (US)

(73) Assignee: Quality Product LLC, Walnut Creek, CA (US)

( * ) Notice: Subject to any disclaimer, the term of this patent is extended or adjusted under 35 U.S.C. 154(b) by 0 days.

(21) Appl. No.: 14/166,633

(22) Filed: Jan. 28, 2014

Related U.S. Application Data

(60) Provisional application No. 61/916,046, filed on Dec. 13, 2013.

(51) Int. Cl.
*E04D 13/18* (2014.01)

(52) U.S. Cl.
USPC ........................................ 52/747.1; 52/173.3

(58) Field of Classification Search
USPC .......... 52/173.3, 710, 747.1, 58, 60; 136/251, 136/244, 291
See application file for complete search history.

(56) References Cited

U.S. PATENT DOCUMENTS

| | | | | |
|---|---|---|---|---|
| 510,315 A * | 12/1893 | Begtrup | ............................. | 73/512 |
| 511,576 A * | 12/1893 | Baker | ............................. | 24/132 R |
| 516,017 A * | 3/1894 | La Rue | ............................. | 126/99 R |
| 519,444 A * | 5/1894 | Clark | ............................. | 417/547 |
| 562,225 A * | 6/1896 | Hutter | ............................. | 215/241 |
| 564,958 A * | 7/1896 | Holmes | ............................. | 384/458 |
| 565,505 A * | 8/1896 | Publow | ............................. | 172/707 |
| 3,630,253 A * | 12/1971 | Sherman | ............................. | 411/176 |
| 4,112,922 A * | 9/1978 | Skinner et al. | ............................. | 126/664 |
| 4,146,785 A * | 3/1979 | Neale | ............................. | 250/203.4 |
| 4,154,223 A * | 5/1979 | Lof | ............................. | 126/713 |
| 4,219,011 A * | 8/1980 | Knoos | ............................. | 126/666 |
| 4,271,825 A * | 6/1981 | Schwob et al. | ............................. | 126/705 |
| 4,429,872 A * | 2/1984 | Capachi | ............................. | 473/490 |
| 4,570,408 A * | 2/1986 | Frascaroli et al. | ............................. | 52/843 |
| 4,691,818 A * | 9/1987 | Weber | ............................. | 198/666 |
| 4,718,185 A * | 1/1988 | Conlin et al. | ............................. | 40/442 |
| 4,966,631 A * | 10/1990 | Matlin et al. | ............................. | 136/244 |
| 5,046,791 A * | 9/1991 | Kooiman | ............................. | 312/265.1 |
| 5,127,762 A * | 7/1992 | Havlovitz | ............................. | 403/298 |
| 5,143,556 A * | 9/1992 | Matlin | ............................. | 136/244 |
| 5,144,780 A * | 9/1992 | Gieling et al. | ............................. | 52/298 |
| 5,164,019 A * | 11/1992 | Sinton | ............................. | 136/249 |
| 5,164,020 A * | 11/1992 | Wagner et al. | ............................. | 136/251 |
| 5,203,135 A * | 4/1993 | Bastian | ............................. | 52/848 |
| 5,205,694 A * | 4/1993 | Nagoshi et al. | ............................. | 411/399 |
| 5,232,518 A * | 8/1993 | Nath et al. | ............................. | 136/251 |

(Continued)

*Primary Examiner* — Mark Wendell
(74) *Attorney, Agent, or Firm* — Temmerman Law Office; Mathew J. Temmerman

(57) ABSTRACT

A rail-less roof mounting system for installing photovoltaic (PV) modules on a roof structure comprises a base mount assembly that engages with a clamp assembly and attaches to the roof structure. The base mount assembly comprises a base member having a waterproof means, a block slider, a top slider and a covering means. An elevated seal portion of a block slider includes a borehole to receive the waterproof means. A vertical engaging portion of the block slider is attached with a sliding seal member of the top slider. The clamp assembly includes a clamp member and a plate member and the clamp member is attached with a track of the top slider. The clamp member interlocks the PV modules to provide a corner-to-corner coupling arrangement, which enables the connection of PV module corners to adjacent PV module corners by sandwiching above and beneath frame members of the PV modules.

25 Claims, 12 Drawing Sheets

(56) References Cited

U.S. PATENT DOCUMENTS

| | | | | |
|---|---|---|---|---|
| 5,316,592 | A * | 5/1994 | Dinwoodie | 136/244 |
| 5,497,587 | A * | 3/1996 | Hirai et al. | 52/173.3 |
| 5,505,788 | A * | 4/1996 | Dinwoodie | 136/246 |
| D374,169 | S * | 10/1996 | Kopish | D8/382 |
| 5,571,338 | A * | 11/1996 | Kadonome et al. | 136/251 |
| 5,596,981 | A * | 1/1997 | Soucy | 126/704 |
| 5,628,580 | A * | 5/1997 | Rinderer | 403/314 |
| D387,655 | S * | 12/1997 | Kopish | D8/382 |
| 5,706,617 | A * | 1/1998 | Hirai et al. | 52/173.3 |
| 5,746,029 | A * | 5/1998 | Ullman | 52/27 |
| 5,746,839 | A * | 5/1998 | Dinwoodie | 136/251 |
| 5,960,790 | A * | 10/1999 | Rich | 126/623 |
| 6,061,978 | A * | 5/2000 | Dinwoodie et al. | 52/173.3 |
| 6,093,884 | A * | 7/2000 | Toyomura et al. | 136/244 |
| 6,105,317 | A * | 8/2000 | Tomiuchi et al. | 52/173.3 |
| 6,111,189 | A * | 8/2000 | Garvison et al. | 136/244 |
| 6,148,570 | A * | 11/2000 | Dinwoodie et al. | 52/173.3 |
| 6,201,180 | B1 * | 3/2001 | Meyer et al. | 136/244 |
| 6,207,889 | B1 * | 3/2001 | Toyomura et al. | 136/244 |
| 6,269,596 | B1 * | 8/2001 | Ohtsuka et al. | 52/173.3 |
| 6,274,402 | B1 * | 8/2001 | Verlinden et al. | 438/98 |
| 6,295,818 | B1 * | 10/2001 | Ansley et al. | 60/641.8 |
| 6,313,395 | B1 * | 11/2001 | Crane et al. | 136/244 |
| 6,337,283 | B1 * | 1/2002 | Verlinden et al. | 438/706 |
| 6,360,491 | B1 * | 3/2002 | Ullman | 52/22 |
| 6,370,828 | B1 * | 4/2002 | Genschorek | 52/200 |
| 6,387,726 | B1 * | 5/2002 | Verlinden et al. | 438/98 |
| 6,423,568 | B1 * | 7/2002 | Verlinden et al. | 438/98 |
| 6,465,724 | B1 * | 10/2002 | Garvison et al. | 136/244 |
| 6,495,750 | B1 * | 12/2002 | Dinwoodie | 136/251 |
| 6,501,013 | B1 * | 12/2002 | Dinwoodie | 136/251 |
| 6,523,320 | B2 * | 2/2003 | Stoof | 52/651.05 |
| 6,534,702 | B1 * | 3/2003 | Makita et al. | 136/244 |
| 6,534,703 | B2 * | 3/2003 | Dinwoodie | 136/251 |
| 6,568,873 | B1 * | 5/2003 | Peterson | 403/305 |
| 6,570,084 | B2 * | 5/2003 | Dinwoodie | 136/251 |
| 6,586,668 | B2 * | 7/2003 | Shugar et al. | 136/244 |
| 6,670,541 | B2 * | 12/2003 | Nagao et al. | 136/251 |
| 6,672,018 | B2 * | 1/2004 | Shingleton | 52/173.3 |
| 6,675,545 | B2 * | 1/2004 | Chen et al. | 52/586.1 |
| 6,675,580 | B2 * | 1/2004 | Ansley et al. | 60/641.8 |
| 6,676,326 | B2 * | 1/2004 | Wu | 403/329 |
| 6,722,357 | B2 * | 4/2004 | Shingleton | 126/600 |
| 6,761,008 | B2 * | 7/2004 | Chen et al. | 52/586.1 |
| 6,784,360 | B2 * | 8/2004 | Nakajima et al. | 136/251 |
| 6,809,251 | B2 * | 10/2004 | Dinwoodie | 136/251 |
| 6,809,253 | B2 * | 10/2004 | Dinwoodie | 136/251 |
| 6,935,623 | B2 * | 8/2005 | Cook et al. | 256/65.08 |
| 6,959,517 | B2 * | 11/2005 | Poddany et al. | 52/173.3 |
| 6,993,917 | B2 * | 2/2006 | Unger et al. | 62/6 |
| 7,043,884 | B2 * | 5/2006 | Moreno | 52/235 |
| 7,172,184 | B2 * | 2/2007 | Pavani et al. | 269/37 |
| 7,328,534 | B2 * | 2/2008 | Dinwoodie | 52/173.3 |
| 7,339,110 | B1 * | 3/2008 | Mulligan et al. | 136/256 |
| 7,406,800 | B2 * | 8/2008 | Cinnamon et al. | 52/173.3 |
| 7,435,897 | B2 * | 10/2008 | Russell | 136/244 |
| 7,592,537 | B1 * | 9/2009 | West | 136/251 |
| 7,634,875 | B2 * | 12/2009 | Genschorek | 52/173.3 |
| 7,774,998 | B2 * | 8/2010 | Aschenbrenner | 52/173.3 |
| 7,895,808 | B1 * | 3/2011 | Wentworth et al. | 52/741.1 |
| 7,905,064 | B1 * | 3/2011 | Wentworth et al. | 52/173.3 |
| 7,987,641 | B2 | 8/2011 | Cinnamon | |
| 8,109,048 | B2 | 2/2012 | West et al. | |
| 8,151,522 | B2 * | 4/2012 | Stearns et al. | 52/58 |
| 8,166,713 | B2 * | 5/2012 | Stearns et al. | 52/58 |
| 8,176,693 | B2 * | 5/2012 | Abbott et al. | 52/173.3 |
| 8,181,398 | B2 * | 5/2012 | Stearns et al. | 52/58 |
| 8,225,557 | B2 * | 7/2012 | Stearns et al. | 52/58 |
| 8,240,109 | B2 * | 8/2012 | Cusson et al. | 52/745.05 |
| 8,245,454 | B2 * | 8/2012 | Stearns et al. | 52/58 |
| 8,256,169 | B2 * | 9/2012 | Cusson et al. | 52/173.3 |
| 8,272,174 | B2 * | 9/2012 | Stearns et al. | 52/58 |
| 8,316,590 | B2 * | 11/2012 | Cusson | 52/173.3 |
| 8,365,479 | B2 * | 2/2013 | Tucker | 52/173.3 |
| 8,413,388 | B2 * | 4/2013 | Stearns et al. | 52/58 |
| 8,424,255 | B2 * | 4/2013 | Lenox et al. | 52/173.3 |
| 8,464,496 | B2 * | 6/2013 | Cusson et al. | 52/745.06 |
| 8,479,459 | B2 * | 7/2013 | Tucker | 52/173.3 |
| 8,505,248 | B1 * | 8/2013 | Leong et al. | 52/173.3 |
| 8,511,006 | B2 * | 8/2013 | Reisdorf et al. | 52/173.3 |
| 8,578,666 | B2 * | 11/2013 | Yen | 52/173.3 |
| 8,590,223 | B2 * | 11/2013 | Kilgore et al. | 52/173.3 |
| 8,613,169 | B2 * | 12/2013 | Sherman et al. | 52/173.3 |
| 8,650,812 | B2 * | 2/2014 | Cusson | 52/173.3 |
| 8,683,751 | B2 * | 4/2014 | Stearns | 52/58 |
| 8,683,761 | B2 * | 4/2014 | Danning | 52/173.3 |
| 8,689,517 | B2 * | 4/2014 | Schaefer et al. | 52/710 |
| 8,695,290 | B1 * | 4/2014 | Kim et al. | 52/173.3 |
| 8,701,354 | B2 * | 4/2014 | Stearns et al. | 52/24 |
| 8,707,655 | B2 * | 4/2014 | Schaefer et al. | 52/710 |
| 8,713,881 | B2 * | 5/2014 | DuPont et al. | 52/489.2 |
| 8,740,163 | B1 * | 6/2014 | Taylor et al. | 248/237 |
| 8,745,935 | B2 * | 6/2014 | DuPont et al. | 52/173.3 |
| 8,763,968 | B2 * | 7/2014 | Liebendorfer | 248/237 |
| 8,782,972 | B2 * | 7/2014 | Grieco | 52/173.3 |
| 8,782,983 | B2 * | 7/2014 | Stearns | 52/410 |
| 8,806,814 | B2 * | 8/2014 | Tseng et al. | 52/173.3 |
| 8,813,460 | B2 * | 8/2014 | Cinnamon et al. | 52/747.1 |
| 8,826,618 | B2 * | 9/2014 | Stearns | 52/410 |
| 8,833,033 | B2 * | 9/2014 | Schaefer et al. | 52/710 |
| 8,839,573 | B2 * | 9/2014 | Cusson et al. | 52/173.3 |
| 8,875,453 | B2 * | 11/2014 | Kanczuzewski et al. | 52/173.3 |
| 2002/0046506 | A1 * | 4/2002 | Ullman | 52/1 |
| 2002/0078991 | A1 * | 6/2002 | Nagao et al. | 136/251 |
| 2003/0010372 | A1 * | 1/2003 | Dinwoodie | 136/244 |
| 2003/0015637 | A1 * | 1/2003 | Liebendorfer | 248/237 |
| 2003/0070368 | A1 * | 4/2003 | Shingleton | 52/173.3 |
| 2003/0175071 | A1 * | 9/2003 | Layfield | 403/292 |
| 2004/0063265 | A1 * | 4/2004 | Noble | 438/200 |
| 2004/0163338 | A1 * | 8/2004 | Liebendorfer | 52/173.1 |
| 2004/0179892 | A1 * | 9/2004 | Du Preez | 403/300 |
| 2006/0005875 | A1 * | 1/2006 | Haberlein | 136/251 |
| 2006/0118163 | A1 * | 6/2006 | Plaisted et al. | 136/251 |
| 2006/0156648 | A1 * | 7/2006 | Thompson et al. | 52/173.3 |
| 2007/0079865 | A1 * | 4/2007 | Warfield et al. | 136/244 |
| 2007/0102036 | A1 * | 5/2007 | Cinnamon | 136/244 |
| 2008/0029144 | A1 * | 2/2008 | Brazier et al. | 136/206 |
| 2009/0078299 | A1 * | 3/2009 | Cinnamon et al. | 136/244 |
| 2012/0298186 | A1 | 11/2012 | West | |
| 2013/0186017 | A1 * | 7/2013 | Kassem, Gary | 52/173.3 |

\* cited by examiner

RAIL-LESS ROOF MOUNTING SYSTEM

RELATED APPLICATIONS

This application claims priority from the U.S. provisional Application with Ser. No. 61/916046 filed on Dec. 13, 2013. The disclosure of the provisional application is incorporated herein as if set out in full.

BACKGROUND OF THE DISCLOSURE

Technical Field Of The Disclosure

The present embodiment relates in general to mounting systems for photovoltaic (PV) modules on roof structures. More specifically, the present disclosure relates to a rail-less photovoltaic (PV) module mounting system for providing a cost-effective means to install a plurality of photovoltaic (PV) modules on a roof structure.

DESCRIPTION OF THE RELATED ART

With the increased use of photovoltaic (PV) roofing systems for generating electricity, a demand for mounting hardware, which attaches frames for the purpose of installing the PV modules to the roof structure or any other support structure, has been developed. In recent years, various kinds of mounting structures have been used which allow the installation of PV modules to the roof structures. Mounting structures come in a variety of sizes and patterns to meet installation purposes. However, most of the mounting structures require increased labor time and cost for installation of the PV modules on the roof structures.

Conventional mounting structures for supporting PV modules in frames have considerable drawbacks. For example, many mounting structures utilize rails to mount the PV modules to the roof structure to form a PV array. The use of these rails requires additional materials to support the PV modules. Because of use of the additional material, these traditional mounting structures can result in excess shipping costs. They can also limit the PV array layout possibilities and dramatically increase the time for designing, engineering and installing the mounting structures. Existing devices are expensive, difficult to use and can require additional manpower to install. For example, a typical 5 kW PV mounting system designed to mount 20 PV panels (15.37% efficient) mounted on a traditional rail mounting system requires approximately 302 parts at a total cost of $0.69/W retail for the mounting structure only and weighs over 300 Lbs. Typical installation times for a simple 4×5 (4 rows and 5 columns) PV module rail based mounting system are approximately 49 man-hours.

Traditional rail mounting systems require 5 penetrations per mount, 4 mounts per PV module, additional grounding lugs, and requires specifically engineered PV modules. In addition, existing rail mounting systems may have substandard waterproofing for roof penetrations, along with complex grounding, wire management, and increased labor time on the roof structure due to design flaws. Hard and soft balance of system (BOS) may include bypass diodes, blocking diodes, solar controller, wiring system, battery and/or inverter etc. The hard and soft balance of system (BOS) costs for PV rail mounting system are high due to high material costs as well as long system engineering and installation times. Also, the traditional rail mounting systems require long strings that are difficult to break up, causing difficulty in working around roof obstructions (e.g. vents, skylights).

One of the existing mounting systems describes an integrated module frame and racking system for a solar panel. The system comprises a plurality of solar modules and a plurality of splices for coupling the plurality of solar modules together. The plurality of splices provide a way to make the connected modules mechanically rigid both during transport to the roof and after mounting for the lifetime of the system; provide wiring connections between modules; provide an electrical grounding path for the modules; provide a way to add modules to the panel; and provide a way to remove or change a defective module. Connector sockets are provided on the sides of the PV modules to simplify the electrical assembly when the PV modules are connected together with splices. However, the frame of the PV module is installed with a groove to attach the mounting bracket and a hole to insert the splice to connect the PV modules, which results in a labor-intensive operation. In addition, it requires one mounting bracket per PV module and multiple holes in the roof structure are required for installation, increasing the risk of leaks.

Another existing mounting system discloses a photovoltaic (PV) module framing and coupling system which enables the attachment of PV modules to a roof or other mounting surface without requiring the use of separate structural support members. The system provides a parallel coupling for securely interlocking the outside surfaces of parallel frame members together in a side-to-side arrangement to form an array with improved structural load distribution. The coupling member may attach to a slot in the frame at substantially any position along the length of the frame thereby enabling the interconnection of adjacent PV modules along both an x and y-axis. The system may further provide a rotating portion and locking portion for coupling to the frame attachment, mounting brackets for direct connection to a mounting surface, grounding teeth for the automatic creation of a reliable two axis grounding matrix, and a rapid twist-lock engagement means for reliably interlocking and aligning PV modules in the array. However, this embodiment includes a side-to-side arrangement to form an array and an additional groove/slot is formed on the frame to engage coupling member, which enables the interconnection of frames of adjacent PV modules. In addition, the parallel couplings are extended beyond corner regions of PV modules.

Various other mounting systems currently available are impossible to retrofit to existing roofs without cutting the shingles. The removal of a single PV panel from the PV array installed using some of these aforementioned mounting structures is difficult and can result in re-work thereby increasing labor and material costs. Some other systems do not allow for the capability to independently remove a single PV panel without deconstructing an entire row of PV panels, which significantly increases maintenance costs.

Therefore, there is a need for a rail-less roof mounting system that would provide a cost effective and improved means for PV module installations. Such a rail-less roof mounting system would provide an efficient means of installation that does not require any additional material or structure to support the rail-less roof mounting system. Such a rail-less roof mounting system would provide a corner-to-corner coupling arrangement enabling the bridging of a PV module corner directly with adjacent PV module corner. Such a needed device would provide reduced shipping and hardware costs, labor and installation time and cost; reduce the dead load on the roof structure along with design engineering costs; and hard and soft balance of system (BOS) cost. This rail-less roof mounting system would provide a single grounding lug and a single point of penetration with an elevated seal portion for waterproofing the roof structure.

Such a rail-less roof mounting system would typically be designed for implementation on composition shingle roofs, tile roofs, metal roofs, low slope roofs, or any roof that would benefit from being waterproof. This mounting system would also provide simple grounding, wire management, and structural quality. This system would be simple, inexpensive, and lightweight. This system would provide an improved engineering design to accommodate high snow and wind loads. Further, this rail-less roof mounting system would allow an installer to easily work around roof obstructions like vents, skylights, and other roof protrusions. This system would also minimize the number of parts and tools needed to assemble and install the PV module. This rail-less roof mounting system would provide the ability to increase vertical leveling adjustability; to independently remove a single PV module without deconstructing an entire row of the PV array; and allow for easy mounting height adjustment after PV modules are installed. Finally, this rail-less roof mounting system would require less manpower to install and rework.

SUMMARY OF THE DISCLOSURE

To minimize the limitations found in the prior art, and to minimize other limitations that will be apparent upon the reading of the specifications, preferred embodiment of the present invention provides a rail-less roof mounting system for installing a plurality of photovoltaic (PV) modules on a roof structure. The rail-less roof mounting system comprises a base mount assembly attached to the roof structure. The base mount assembly includes a base member having a top surface and a bottom surface, a block slider having an elevated seal portion and a vertical engaging portion, and a top slider having a top portion and a bottom portion, and a clamp assembly having a clamp member and a plate member.

The top surface of the base member is attached with a waterproof means and the bottom surface of the base member is engaged with the roof structure. The elevated seal portion, having a borehole formed therethrough to receive the waterproof means, engages with the base member and the roof structure, utilizing at least one tightening means that is inserted through the borehole. The vertical engaging portion has a vertical groove along a surface thereof. The top slider having a track with a horizontal groove at the top portion and a sliding seal member with a sliding groove and a slot at the bottom portion. The sliding seal member slides over the vertical engaging portion through the sliding groove and secures, utilizing at least one fastening means that inserts through the vertical groove on the vertical engaging portion. The base mount assembly further includes a covering means that is adaptable to securely cover the at least one tightening means on the elevated seal portion for providing waterproof sealing between the base mount assembly and the roof structure.

The clamp assembly comprises the clamp member that is coupled with the plate member. The clamp member includes a plurality of apertures on an inner surface thereof and a plurality of holes to receive a plurality of screws and the plate member that includes a plurality of slots. The plurality of apertures and the plurality of slots are oriented along a common longitudinal path to receive the at least one securing means. The at least one securing means is slid through the horizontal groove and inserted through the plurality of slots on the plate member and the plurality of apertures on the inner surface of the clamp member. Thus, the clamp member, the plate member and the top slider are secured to each other utilizing the at least one securing means. Thus, the plurality of PV modules are interlocked in a way to provide a corner-to-corner coupling arrangement which enables the connection of PV module corners to adjacent PV module corners by sandwiching above and beneath the frame members of the PV modules.

A first objective of the present invention is to provide a corner-to-corner coupling arrangement, enabling the bridging of a PV module corner directly with adjacent PV module corner.

A second objective of the present invention is to provide an efficient means of installation that does not require any additional material or structure to support the rail-less roof mounting system.

A third objective of the present invention is to provide a cost-effective means for PV modules installation.

A fourth objective of the present invention is to provide a rail-less roof mounting system that reduces dead load on a roof structure along with design engineering costs and hard and soft balance of system (BOS) costs.

A fifth objective of the present invention is to provide a rail-less roof mounting system that is lightweight and to provide improved engineering design to accommodate high snow and wind loads.

A sixth objective of the present invention is to provide a rail-less roof mounting system that allows an installer to easily work around roof obstructions like vents, skylights, and other roof protrusions.

A seventh objective of the present invention is to provide a rail-less roof mounting system that minimize the number of parts and tools needed to assemble and install the PV module.

An eighth objective of the present invention is to provide a rail-less roof mounting system that provides the ability to increase vertical leveling adjustability.

A ninth objective of the present invention is to provide a rail-less roof mounting system that independently removes a single PV module without deconstructing an entire row of the PV array.

Another objective of the present invention is to provide a rail-less roof mounting system that allows height adjustment of the rail-less roof mounting system after the installation of PV modules.

Yet another object of the present invention is to provide a rail-less roof mounting system that has a single grounding lug and a single point of penetration with an elevated seal portion for waterproofing the roof structure.

Still yet another object of the present invention is to provide a rail-less roof mounting system that retrofits into existing roofs without the need to cut shingles.

Yet still another object of the present invention is to provide a rail-less roof mounting system that eliminates the need to transport to the jobsite, configure and cut long heavy rails for installation purposes.

Still yet another object of the present invention is to provide a rail-less roof mounting system that can cantilever PV modules in portrait orientation, landscape orientation or a combination of both.

Yet still another object of the present invention is to provide a rail-less roof mounting system that employs a plurality of wire clips to work in multiple locations to minimize wire management issues.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
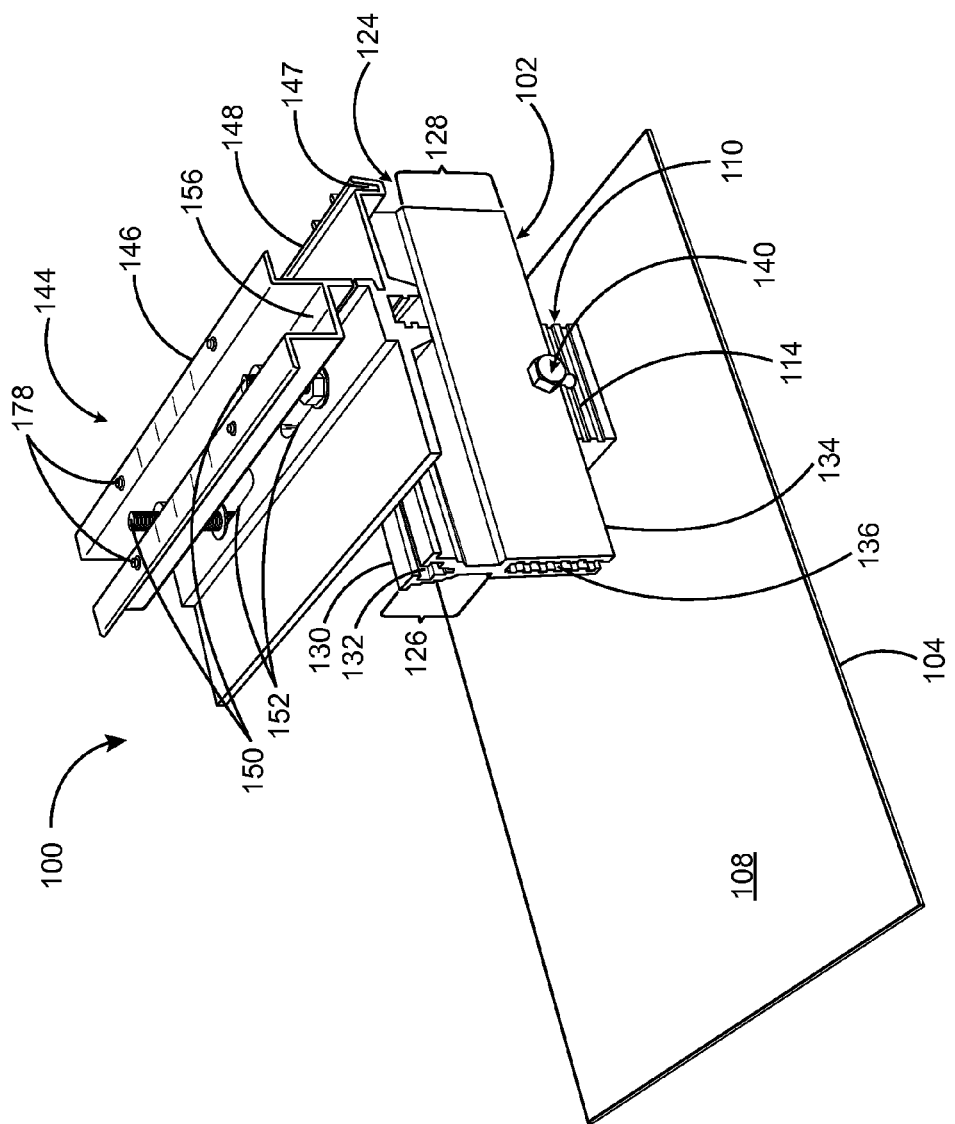
FIG. 1 illustrates a perspective view of a rail-less roof mounting system for installing a plurality of photovoltaic (PV) modules on a roof structure in accordance with the preferred embodiment of the present invention.

Turning now to FIG. 1, a perspective view of a rail-less roof mounting system 100 for installing a plurality of photovoltaic (PV) modules 170, 172, 174 (See FIG. 4) on a roof structure 176 (See FIG. 7) in accordance with the preferred embodiment of the present invention is illustrated. The rail-less roof mounting system 100 comprises a base mount assembly 102 that is associated with a clamp assembly 144 to bridge the plurality of PV modules 170, 172, 174 and to install the plurality of PV modules 170, 172, 174 on the roof structure 176. The base mount assembly 102 attached to the roof structure 176 comprises a base member 104 having a top surface 108 and a bottom surface (not shown), a block slider 110 having an elevated seal portion 112 (See FIG. 2) and a vertical engaging portion 114 and a top slider 124 having a top portion 126 and a bottom portion 128.

The clamp assembly 144 includes a clamp member 146 that is fixed with a plate member 148. The rail-less roof mounting system 100 can be easily disassembled and hence provides a compact means of storage when not in use. The bottom surface (not shown) of the base member 102 is engaged with the roof structure 176. The block slider 110 is connected with the base member 104 and with the bottom portion 128 of the top slider 124. A track 130 having a horizontal groove 132 is included at the top portion 126 of the top slider 124 and a sliding seal member 134 having a sliding groove 136 and a slot 138 are included at the bottom portion 128 of the top slider 124. The sliding seal member 134 is secured to the block slider 110 utilizing at least one fastening means 140. The clamp member 146 and the plate member 148 are attached with the track 130 utilizing at least one securing means 150. The clamp member 146 includes a plurality of apertures 154 (See FIG. 10) on an inner surface 156 thereof and a plurality of holes 157 to receive a plurality of screws 178. The plate member 148 includes a plurality of slots 152 to receive the at least one securing means 150.

Figure 2:
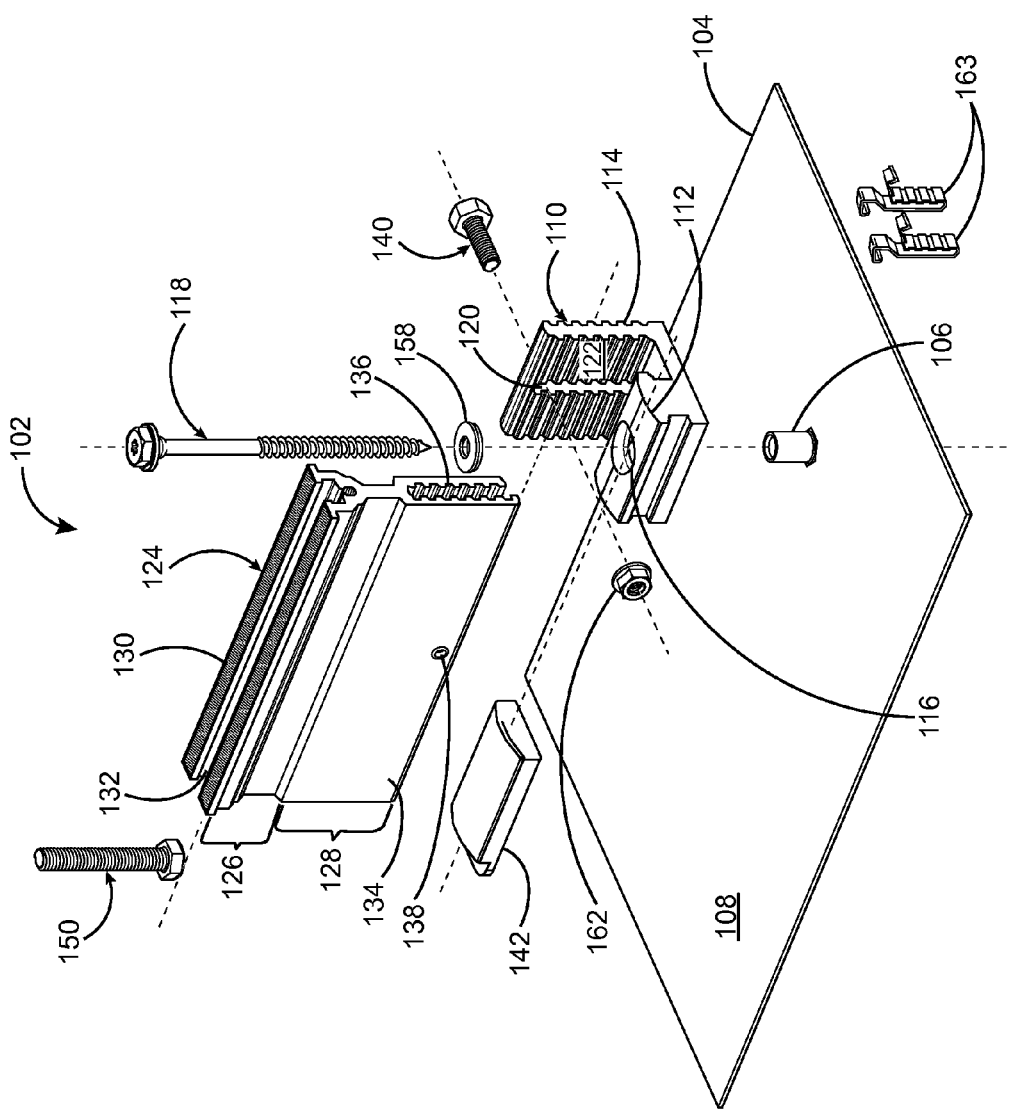
FIG. 2 illustrates an exploded view of a base mount assembly in accordance with the preferred embodiment of the present invention.

FIG. 2 illustrates an exploded view of the base mount assembly 102 in accordance with the preferred embodiment of the present invention. A waterproof means 106 is attached on the top surface 108 of the base member 104. In the preferred embodiment, the base member 104 is made from an aluminum flashing. The bottom surface (not shown) of the base member 104 is engaged with the roof structure 176. The elevated seal portion 112, having a borehole 116 formed therethrough to receive the waterproof means 106, engages with the base member 104 and the roof structure 176, utilizing at least one tightening means 118 that is inserted through the borehole 116 and the waterproof means 106. Then, the at least one tightening means 118 comes from the borehole 116 and the waterproof means 106 is drilled into the roof structure 176. The base mount assembly 102 includes a covering means 142 that is adaptable to securely cover the at least one tightening means 118 on the elevated seal portion 112 for providing waterproof sealing between the base mount assembly 102 and the roof structure 176.

The at least one tightening means 118 is of the type typically known in construction/installation and may comprise a structural screw. Specifically, the at least one tightening means 118 is a T-30/hex washer head lag screw. A sealing washer 158 is utilized for fitting on the at least one tightening means 118 and adapted to seal the borehole 116 in the elevated seal portion 112, through which the at least one tightening means 118 is fitted, so as to prevent seepage of water. Preferably, the sealing washer 158 is an annular disc, which is deformable to create a tight seal. In one embodiment, the sealing washer 158 comprises a disk of rigid material such as steel, with a section or outer layer of deformable material that may be selected from a group consisting of: fluorinated silicone, polyurethane and rubber. Additionally, the sealing washer 158, which is most likely to experience wear, is a simple, inexpensive part that can be replaced individually, as needed.

The vertical engaging portion 114 of the block slider 110 has a vertical groove 120 along the surface 122 thereof. The sliding seal member 134 of the top slider 124 slides over the vertical engaging portion 114 through the sliding groove 136 on the top slider 124 and secures to the block slider 110, utilizing the at least one fastening means 140 that is inserted through the vertical groove 120 on the vertical engaging portion 114 and the slot 138 on the sliding seal member 134. Preferably, the at least one fastening means 140 can be in the form of, for example, a cap screw or similar structures. The at least one fastening means 140 is securely tightened utilizing a lock nut 162. Typically, the lock nut is a serrated flange hex nut. The base mount assembly 102 further includes a plurality of wire clips 163 for holding/retaining one or more wires (not shown) from/for each PV module 170, 172, 174 that is mounted to a building surface by the clamp member 146.

Figure 3:
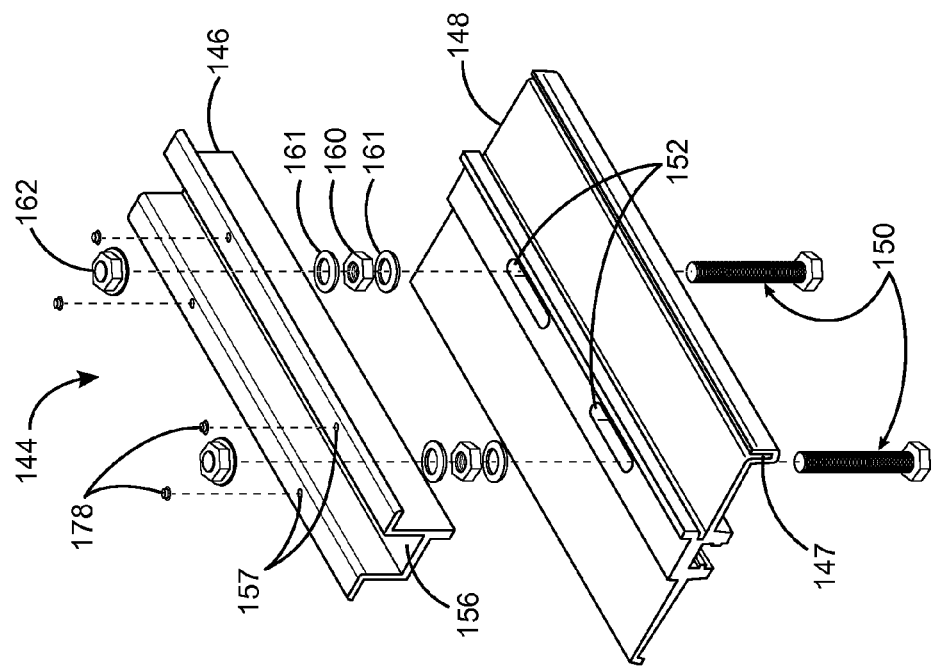
FIG. 3 illustrates an exploded view of a clamp assembly associated with the base mount assembly in accordance with the preferred embodiment of the present invention.

FIG. 3 illustrates an exploded view of the clamp assembly 144 associated with the base mount assembly 102 in accordance with the preferred embodiment of the present invention. The clamp assembly 144 comprises the clamp member 146 that is coupled with the plate member 148. The clamp member 146 includes a plurality of apertures 154 (See FIG. 10) on an inner surface 156 thereof and a plurality of holes 157 to receive a plurality of screws 178, and the plate member 148 includes a plurality of slots 152. The plurality of apertures 154 and the plurality of slots 152 are oriented along a common longitudinal path to receive the at least one securing means 150.

The clamp assembly 144 is assembled with the base mount assembly 102 when in use. The at least one securing means 150 is slid through the horizontal groove 132 and inserted through the plurality of slots 152 on the plate member 148 and the plurality of apertures 154 on the inner surface 156 of the clamp member 146. Thus, the clamp member 146, the plate member 148 and the top slider 124 are secured to each other utilizing the at least one securing means 150. The at least one securing means 150 may comprise a cap screw. Preferably, the at least one securing means 150 is a stainless steel 5/16 "0×2" grade 18/8 machine bolt. While securing the clamp assembly 144 with the base mount assembly 102, an engaging nut 160 and a plurality of retainer rings 161 are utilized with the at least one securing means 150 to provide a tight seal. Preferably, the plurality of retainer rings 161 is made of plastic and the engaging nut 160 is a hex nut. It is noted that the engaging nut 160 utilized with the at least one securing means 150 replaces the conventional brake and provides a tight, secure attachment between the clamp assembly 144 and the base mount assembly 102. The least one securing means 150 is securely tightened utilizing the lock nut 162. Specifically, the lock nut 162 is a serrated flange hex nut.

The clamp member 146 replaces the conventional brake and eliminates edge bridge/mid edge conflict. This clamp assembly 144 works both on top of the base mount assembly 102 as well as independently. Such clamp assembly 144 is adjustable to fit "off-the-shelf" available PV modules. Moreover, the clamp assembly 144 is adjustable to mount most standard size PV modules. Furthermore, the clamp assembly 144 can fit all types of framed and frameless PV modules.

Figure 4:
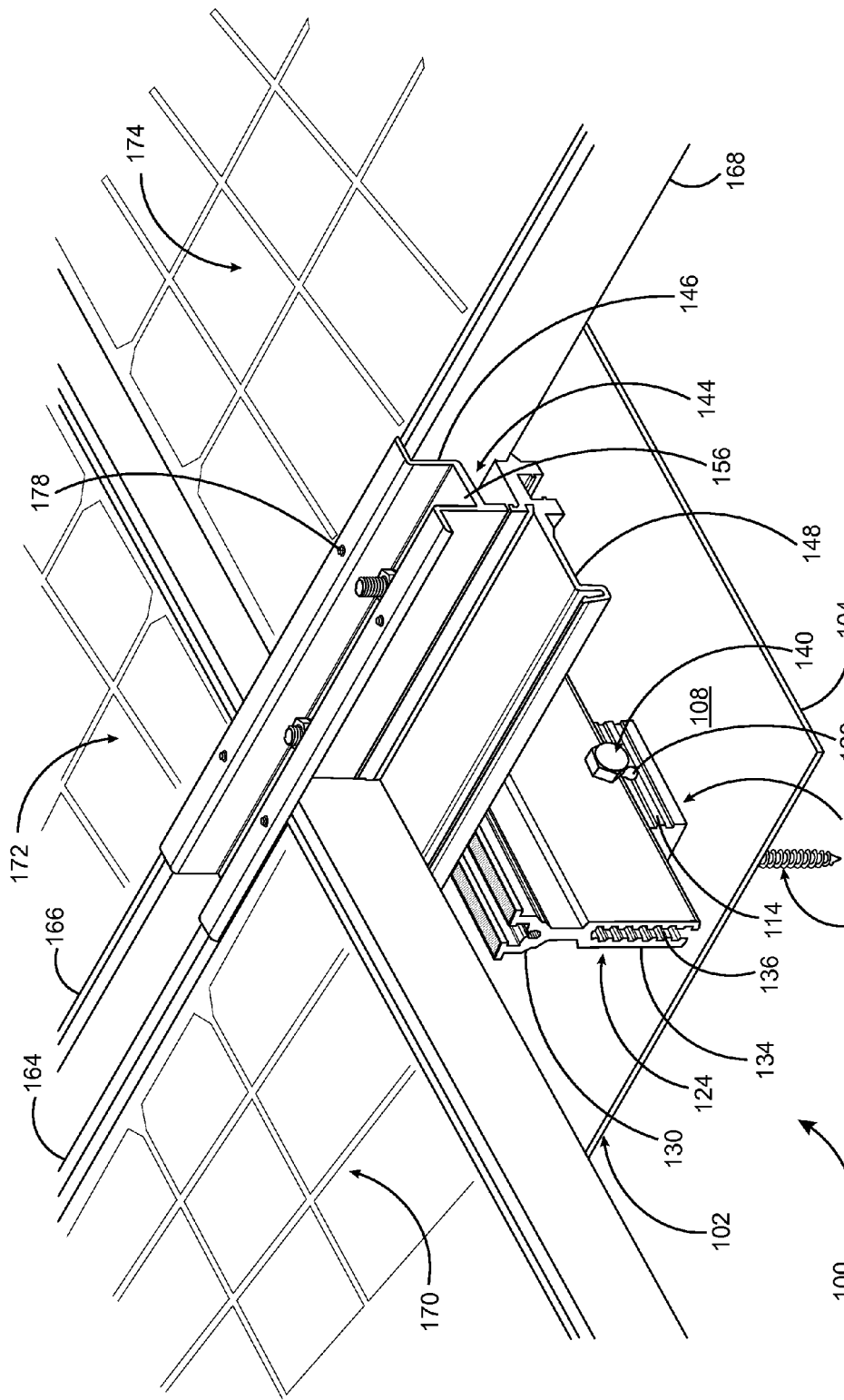
FIG. 4 illustrates a first mounting position of the rail-less roof mounting system interlocking the plurality of PV modules to form a corner-to-corner coupling arrangement in accordance with the preferred embodiment of the present invention.

FIG. 4 illustrates a first mounting position of the rail-less roof mounting system 100 interlocking the plurality of PV modules 170, 172, 174 to form a corner-to-corner coupling arrangement in accordance with the preferred embodiment of the present invention. The clamp member 146 interconnects the frame member 164 of the PV module 170 to the frame member 166 of the adjacent PV module 172. The clamp member 146 is attached to the frame members 164, 166, 168 of the plurality of PV modules 170, 172, 174 by inserting a plurality of screws 178 into the plurality of holes 157 at a middle of a formed PV array. In the first mounting position, the clamp assembly 144 is coupled with the base mount assembly 102, utilizing one of the securing means 150 that is inserted through one of the apertures 154 in the inner surface 156 of the clamp member 146 and one of the slots 152 on the plate member 148.

Figure 5:
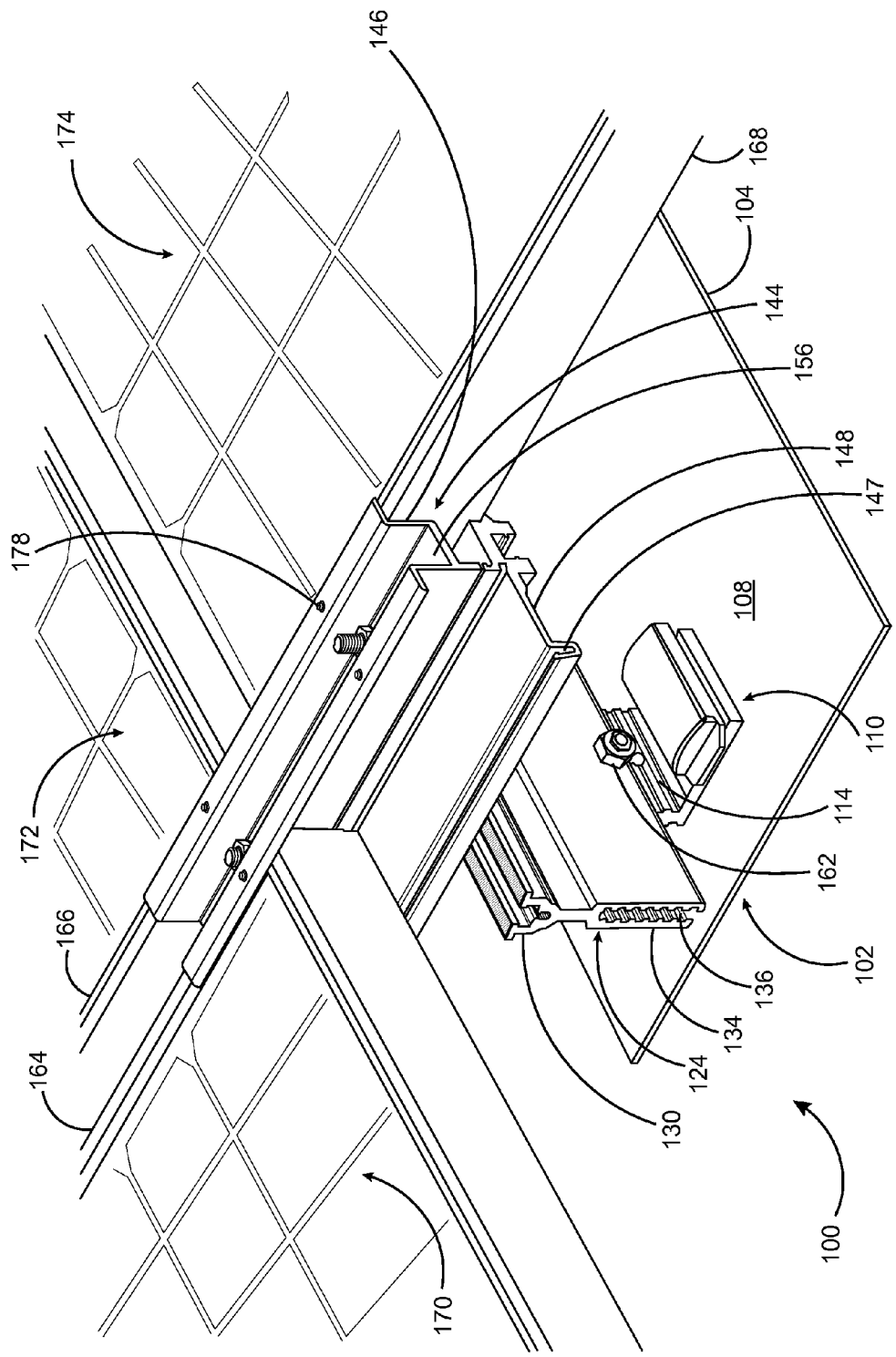
FIG. 5 illustrates a second mounting position of the rail-less roof mounting system interlocking the plurality of PV modules to form the corner-to-corner coupling arrangement in accordance with the preferred embodiment of the present invention.

FIG. 5 illustrates a second mounting position of the rail-less roof mounting system 100 interlocking the plurality of PV modules 170, 172, 174 to form the corner-to-corner coupling arrangement in accordance with the preferred embodiment of the present invention. The clamp member 146 interconnects the frame member 164 of the PV module 170 to the frame member 166 of the adjacent PV module 172. In the second mounting position, the clamp assembly 144 is coupled with the base mount assembly 102 utilizing another securing means 150 that is inserted through another aperture 154 in the inner surface 156 of the clamp member 146 and another slot 152 on the plate member 148.

For instance, the clamp member 146 interlocks corners of the frame members 164, 166, 168 of the plurality of PV modules 170, 172, 174 to form a corner-to-corner coupling arrangement as illustrated in FIGS. 4 and 5. Although the rail-less roof mounting system 100 is shown in FIGS. 4 and 5 holding three PV modules 170, 172, 174, it is noted that the at least one rail-less roof mounting system 100 can bridge four PV modules at the corners in any row and column configuration. Thus, the plurality of PV modules 170, 172, 174 are interlocked in a way to provide the corner-to-corner coupling arrangement which enables the connection of PV module corners to adjacent PV module corners by sandwiching above and beneath the frame members 164, 166, 168 of the plurality of PV modules 170, 172, 174. Moreover, the clamp member 146 interlocks top and bottom surfaces of the frame members 164, 166, 168 of the plurality of PV modules 170, 172, 174 as shown in FIGS. 4 and 5.

In the preferred embodiment, the plurality of PV modules 170, 172, 174 provided is aluminum framed PV modules. However, while the present invention will be described for use with a framed PV module, the present invention is not so limited. Thus, it is within the scope of the present invention that rigid frameless PV modules, i.e. PV modules utilizing glass modules, may also be utilized to practice the present invention. In one embodiment, the corner-to corner coupling arrangement provides connection with other mounting and/or racking components and does not provide attachment or connection with any portion of the roof structure 176 such as waterproofing layers, structural rooftop layers or any/all cosmetic layers.

Figure 6:
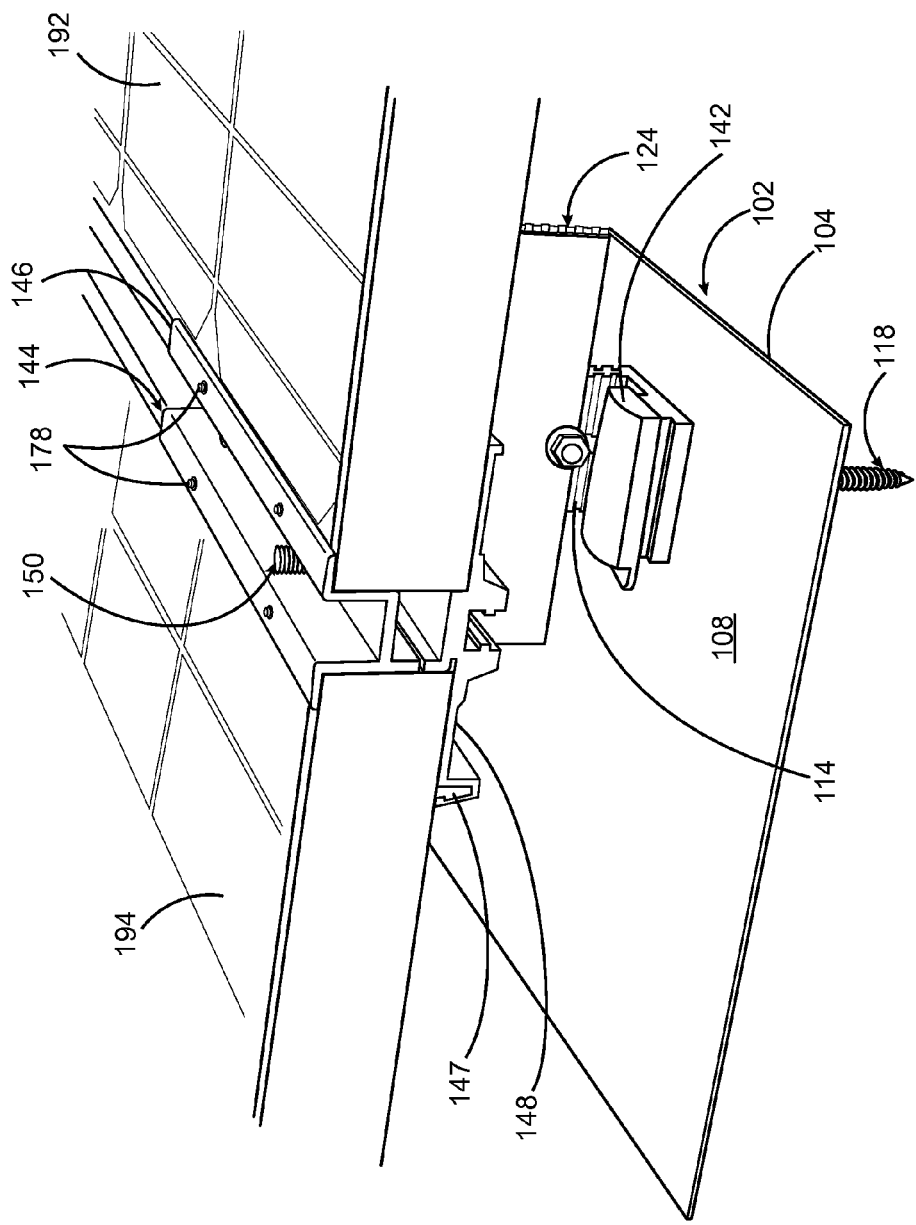
FIG. 6 illustrates the rail-less roof mounting system interlocking two PV modules in an arrangement in accordance with an alternate configuration of the present invention.

FIG. 6 illustrates the rail-less roof mounting system 100 interlocking two PV modules 192, 194 in accordance with an alternate configuration of the present invention. In this configuration, the rail-less roof mounting system 100 interlocks top and bottom surfaces of frame members of two adjacent PV modules 192, 194 at an end of a formed PV array.

Figure 7:
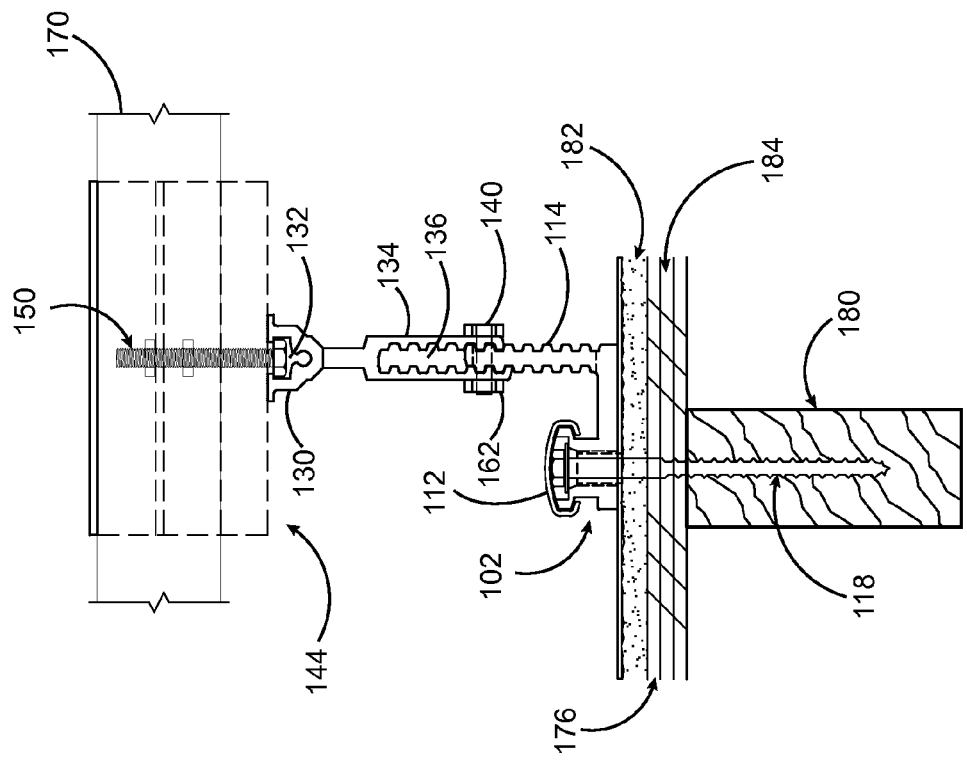
FIG. 7 illustrates installation of the rail-less roof mounting system on the roof structure in accordance with the preferred embodiment of the present invention.

FIG. 7 illustrates installation of the rail-less roof mounting system 100 on the roof structure 176 in accordance with the preferred embodiment of the present invention. The roof structure 176 serves as a mounting surface for the base mount assembly 102. The base member 104 is placed on the roof structure 176 and the at least one tightening means 118 is inserted through the borehole 116, the waterproof means 106 and a roof rafter 180 that is positioned just beneath a roofing material 182 and a roofing sheathing 184. The illustrative installation provides a single point of penetration with the elevated seal portion 112 for providing waterproofing. A minimum embedment depth of 2½ inches is preferred. Typically, the at least one tightening means 118 is a GRK RSS rugged structural screw made of specially hardened steel to provide with high tensile, torque and shear strength. For example, the screw has a 5⁄16 inch nominal diameter underneath the sealing washer 158, a minimum of torque screw to 13 ft-lb and may be made of hardened steel preferably with an all weather coating such as Climatek™ coating. Furthermore, the roof structure 176 can include pre-stamped and/or pre-drilled pilot holes formed therein through which the at least one tightening means 118 can be inserted. For example, the pilot holes have a diameter of about ⅛ of an inch. More profitably, the rail-less roof mounting system 100 is easily and quickly installed with minimal tools, such as a ½ inch open-end box wrench and a ½ inch socket.

A method for installing a plurality of photovoltaic (PV) modules 170, 172, 174 on a roof structure 176 includes the following steps. Firstly, a rail-less roof mounting system 100 is provided for mounting the plurality of PV modules 170, 172, 174. The base member 104 is placed on the roof structure 176 and the block slider 110 is positioned above the base member 104 by inserting the waterproof means 106 through the borehole 116 on the elevated seal portion 112. The at least one tightening means 118 is inserted through the borehole 116 and the waterproof means 106 to secure the block slider 110 and the base member 104 with the roof structure 176. The sliding seal member 134 is slid over the vertical engaging portion 114 through the sliding groove 136 on the top slider 124. The at least one fastening means 140 is inserted through the vertical groove 120 on the vertical engaging portion 114 and the slot 138 on the top slider 124 to attach the top slider 124 to the block slider 110. The at least one fastening means 140 is tightened utilizing the lock nut 162. The at least one securing means 150 is slid through the horizontal groove 132 and inserted through the plurality of slots 152 on the plate member 148 and a plurality of apertures 154 on clamp member 146 to attach the clamp member 146 and the plate member 148 with the track 130 of the top slider 124. The at least one securing means 150 is tightened utilizing the lock nut 162.

Then, the clamp member 146 interconnects the frame member 164 of the PV module 170 to the frame member 166 of the adjacent PV module 172 to provide a corner-to-corner coupling arrangement. Finally, the clamp member 146 is attached with the frame member 164 of the PV module 170 by inserting a plurality of screws 178 into a plurality of holes 157 on the clamp member 146. Thus, the corner-to-corner coupling arrangement enables the connection of PV module corners to adjacent PV module corners by sandwiching above and beneath the frame members 164, 166, 168 of the plurality of PV modules 170, 172, 174.

Figure 8:
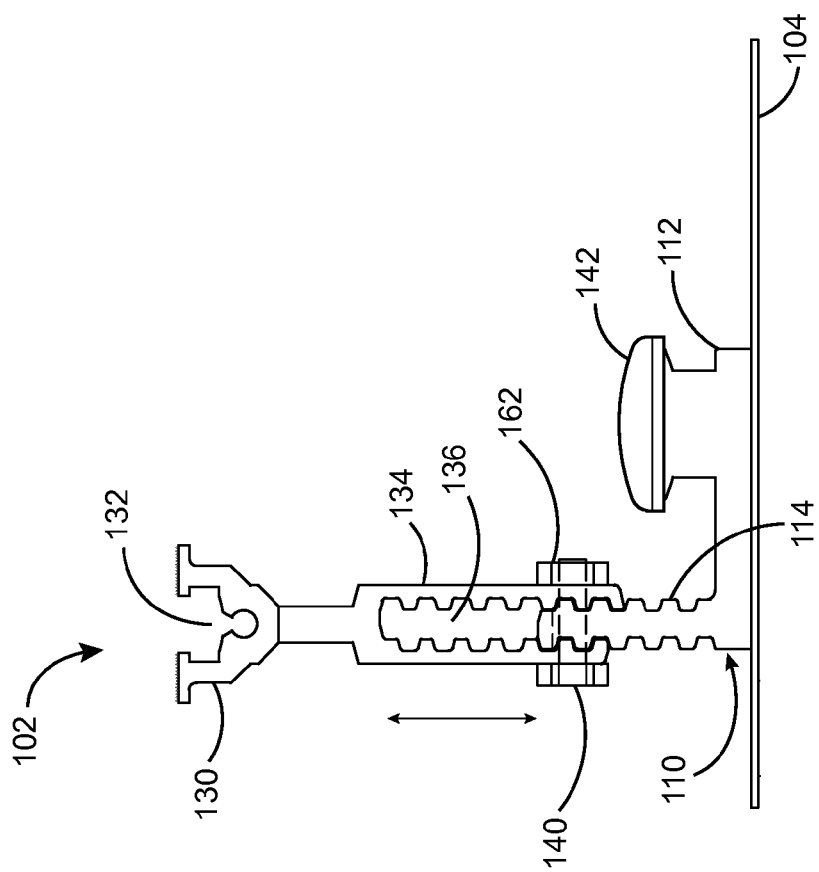
FIG. 8 illustrates the base mount assembly configured to adjust mounting height of the rail-less roof mounting system in accordance with the preferred embodiment of the present invention.

FIG. 8 illustrates the base mount assembly 102 configured to adjust the mounting height of the rail-less roof mounting system 100 in accordance with the preferred embodiment of the present invention. The height of mounting of the rail-less roof mounting system 100 is adjusted by adjusting the position of the top slider 124 along the vertical engaging portion 114 of the block slider 110. The top slider 124 can be moved along the vertical engaging portion 114 and can be secured at desired position or height by tightening the at least one fastening means 140 through the vertical groove 120 on the vertical engaging portion 114 and the slot 138 on the sliding seal member 134.

Figure 9:
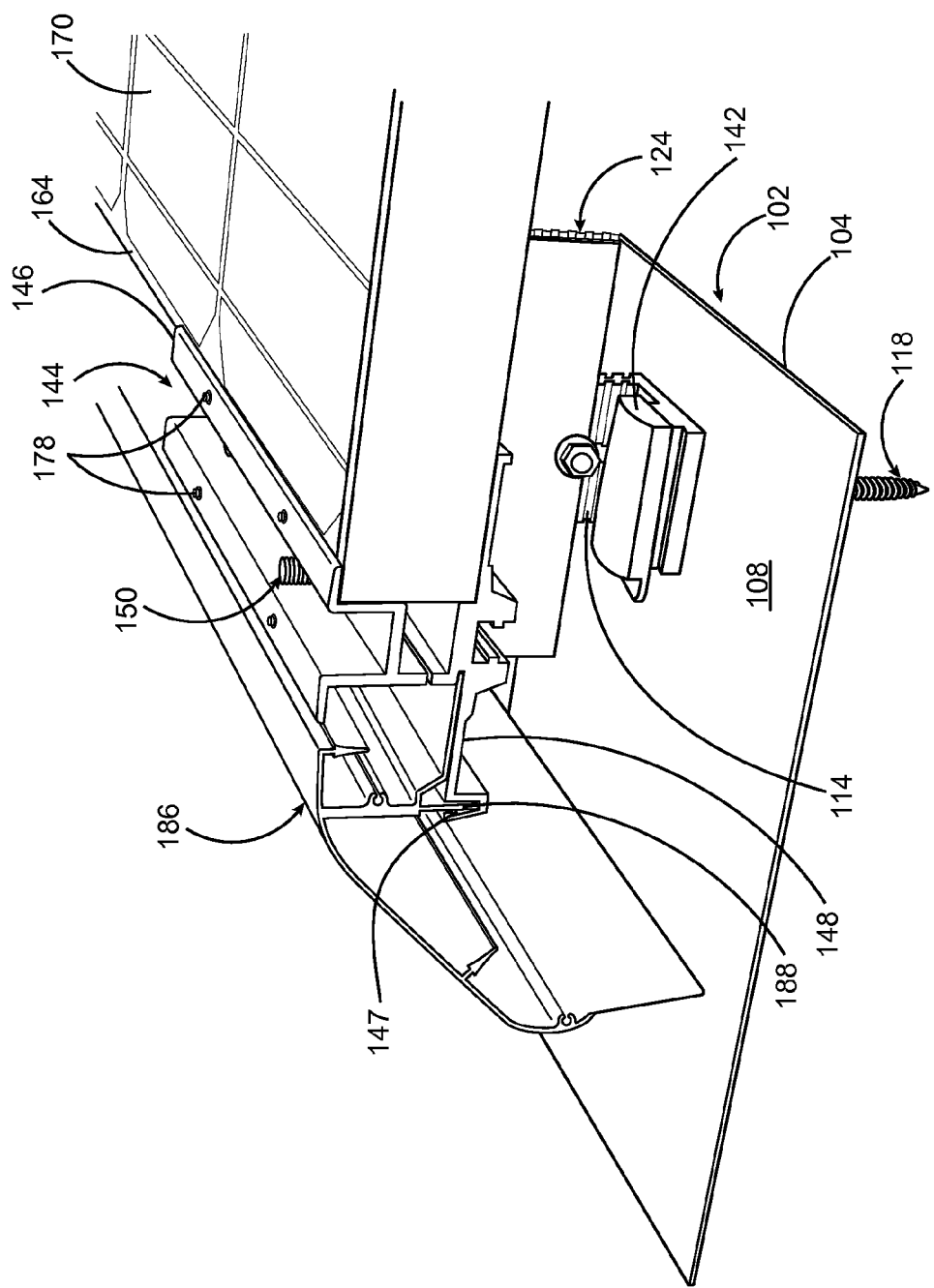
FIG. 9 illustrates a perspective view of a PV array skirt providing a snap-fit engagement with the rail-less roof mounting system in accordance with the preferred embodiment of the present invention.
Figure 10:
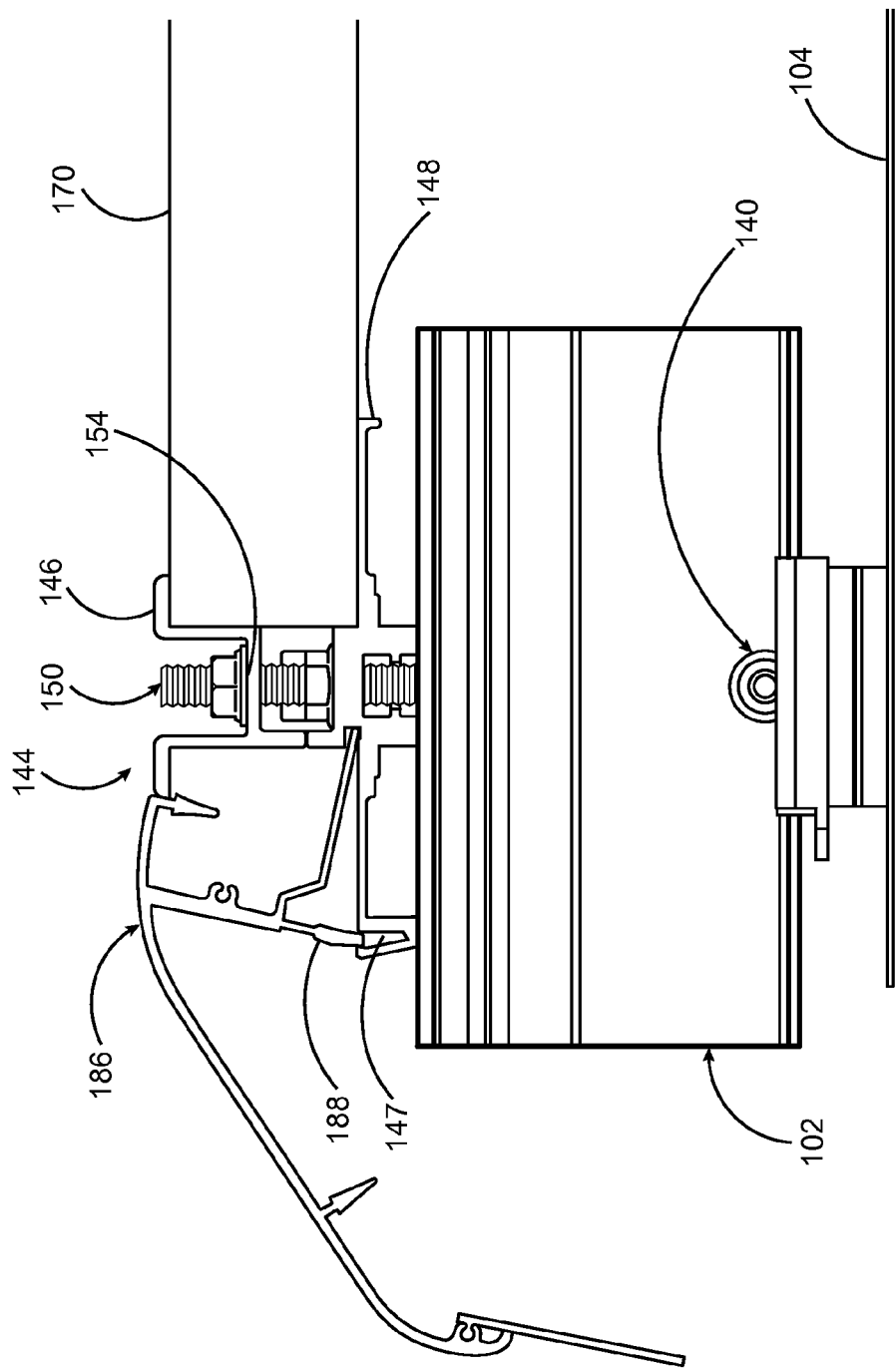
FIG. 10 illustrates a profile view of the PV array skirt providing the snap-fit engagement with the rail-less roof mounting system shown in FIG. 9.

FIGS. 9 and 10 illustrate perspective and profile views of a PV array skirt 186 providing a snap-fit engagement with the rail-less roof mounting system 100 in accordance with the preferred embodiment of the present invention. A PV array skirt 186 is installed on an edge of a PV array. The PV array skirt 186 may provide improved aesthetics, safety and structural performance. The PV array skirt 186 may partially or fully obscure air gap and mounting hardware located beneath the PV array. The PV array skirt 186 may allow for the snap-fit engagement of the PV array skirt 186 to the rail-less roof mounting system 100. The rail-less roof mounting system 100 may also allow for the snap-fit engagement with the plurality of PV modules 170, 172, 174. The snap-fit engagement between the PV array skirt 186 and the rail-less roof mounting system 100 is achieved by inserting an extrusion 188 of the PV array skirt 186 along a grooved edge 147 of the plate member 148. Thus, the grooved edge 147 provides a seat for the extrusion 188 of the PV array skirt 186 to provide the snap-fit engagement. The snap-fit engagement provides a longer landing ability to the plate member 148 and an ability to easily clean out debris from under the PV array skirt 186.

Figure 11:
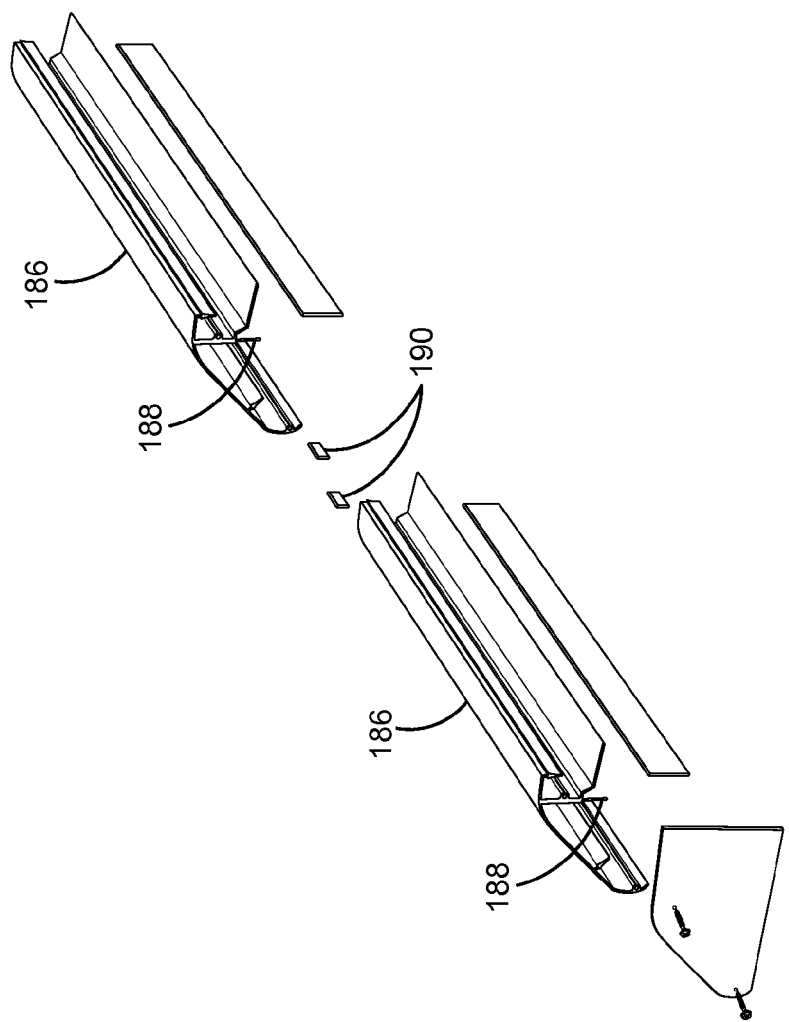
FIG. 11 illustrates a perspective view of interlocking of two PV array skirts in accordance with the preferred embodiment of the present invention.

FIG. 11 illustrates a perspective view of interlocking of two PV array skirts 186 in accordance with the preferred embodiment of the present invention. The two PV array skirts 186 are placed end-to-end and ready to be interlocked together with a plurality of skirt clips 190. The plurality of skirt clips 190 is adaptable to prevent the PV array skirt 186 from sagging. The PV array skirt 186 may be manufactured from bent metal and may snap onto the rail-less roof mounting system 100 via the grooved edge 147 of the plate member 148. The rail-less roof mounting system 100 allows for vertical height adjustment therefore allowing for adjustment of height of the PV array skirt 186 above the roof structure 176 thus preventing the debris from entering the underlying air gap. A gap provided between the PV array skirt 186 and the frame member 164 may be sized in order to enable adequate room for installing the plurality of wire clips 163 or any other mounting structures.

The embodiments discussed above allow for portrait orientation, landscape orientation or a combination of both. In a portrait orientation, the PV array having each of the plurality of PV modules 170, 172, 174 oriented, with the longest axis of the plurality of PV modules 170, 172, 174 extend in a forward-rearward direction, which is typically the south-north direction. The plurality of PV modules 170, 172, 174 have long edges with length running in cross-slope direction. It is noted, however, that the plurality of PV modules 170, 172, 174 can alternatively be oriented in a landscape orientation, that is, with the longest axis of the plurality of PV modules 170, 172, 174 extending in a lateral or side-to-side direction which is typically the east-west direction. Thus, the above-disclosed rail-less roof mounting system 100 can be used for gable roofs, hip roofs and flat and low slope gable roofs. The plurality of PV modules 170, 172, 174 have short edges with width running in cross-slope direction. Further, the rail-less roof mounting system 100 has the ability to cantilever the plurality of PV modules 170, 172, 174 for both portrait and landscape orientation, for example, 13 inch cantilever portrait and 19 inch cantilever landscape.

The preferred embodiment reduces the number of parts, the size, and the cost of the parts, resulting in a total part count of approximately 151(a 50% reduction) and a total mounting system hardware cost of $0.30/W retail (a 54% reduction). Further, the labor time to install the rail-less roof mounting system 100 is decreased by a minimum of 35%, which results in the reduction of installation times by over 55% as installation efficiencies grow. When the rail-less roof mounting system 100 is installed for bridging the plurality of PV modules 170, 172, 174, it is revealed a decrease of around 47% in non-electrical installation hours. Additional system design and procurement soft-costs are reduced by 67%, when utilizing the system.

Figure 12:
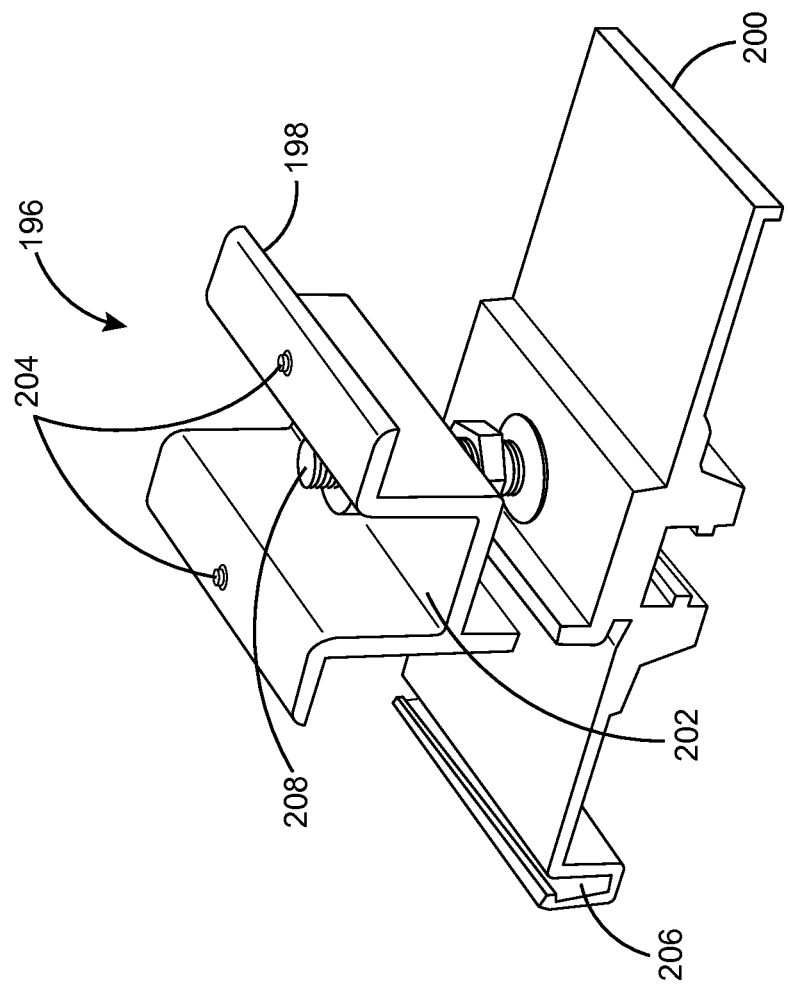
FIG. 12 illustrates one embodiment of a clamp assembly in accordance with the present invention.

FIG. 12 illustrates one embodiment of a clamp assembly 196 in accordance with the present invention. The clamp assembly 196 is small in size and adaptable to use for end-clamping the plurality of PV modules 170, 172, 174. The clamp assembly 196 includes a clamp member 198 and a plate member 200. The clamp member 198 includes an aperture (not shown) on an inner surface 202 thereof and a pair of holes (not shown) to receive a pair of screws 204 and the plate member 200 includes a slot (not shown). The plate member 200 further includes a grooved edge 206 to accommodate the PV array skirt 186. At least one securing means 208 is inserted through the aperture (not shown) of the clamp member 198 and the slot (not shown) of the plate member 200 to engage the clamp member 198 and the plate member 200.

The presently disclosed system is advantageous because it provides the corner-to-corner coupling arrangement, enabling the bridging of corners of the plurality of PV modules 170, 172, 174. The rail-less roof mounting system 100 provides a single grounding lug for assembling the PV array consisting of 300 PV modules or less. Further, the rail-less roof mounting system 100 includes the plurality of wire clips 163, which are designed to work in multiple locations to minimize wire management issues. The rail-less roof mounting system 100 allows for more customizability in the PV array shape by allowing the installer to easily work around roof obstructions like vents, skylights, and other roof protrusions This rail-less roof mounting system 100 provides the ability to increase vertical leveling adjustability, for instance, 3 inch to 5 inch. The rail-less roof mounting system 100 has the ability to independently remove a single PV module without deconstructing an entire row of the PV array and allow for easy mounting height adjustment after the plurality of PV modules 170, 172, 174 are installed. The rail-less roof mounting system 100 can be easily assembled and disassembled and the components can be laid flat for easy storage and shipping. Furthermore, the rail-less roof mounting system 100 would require less manpower to install and rework.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention to not be limited by this detailed description, but by the claims and the equivalents to the claims appended hereto.

What is claimed is:

1. A rail-less roof mounting system for installing a plurality of photovoltaic (PV) modules on a roof structure, the rail-less roof mounting system comprising:
a base mount assembly attached to the roof structure comprising:
a base member having a top surface and a bottom surface, the bottom surface being engaged with the roof structure, the base member includes a waterproof means on the top surface thereof;
a block slider having an elevated seal portion and a vertical engaging portion, the elevated seal portion having a borehole formed therethrough to receive the waterproof means, the vertical engaging portion includes a vertical groove along a surface thereof; and
a top slider attached with the block slider having a top portion and a bottom portion, the top slider having a track with a horizontal groove at the top portion, and a sliding seal member with a sliding groove and a slot at the bottom portion; and
a clamp assembly attached to the base mount assembly having a clamp member with a plurality of apertures on an inner surface and a plate member with a plurality of slots, the clamp member interconnects a frame member of a PV module to a frame member of adjacent PV module;
whereby the plurality of PV modules are interlocked in a way to provide a corner-to-corner coupling arrangement which enables the connection of PV module corners to adjacent PV module corners by sandwiching above and beneath frame members of the plurality of PV modules.

2. The rail-less roof mounting system of claim 1 wherein the block slider and the base member are attached to the roof structure utilizing at least one tightening means that is inserted through the borehole on the elevated seal portion.

3. The rail-less roof mounting system of claim 1 wherein the sliding seal member is adapted to slide over the vertical engaging portion along the sliding groove and secured utilizing at least one fastening means that is inserted through the vertical groove on the vertical engaging portion and the slot at the bottom portion of the top slider.

4. The rail-less roof mounting system of claim 1 wherein the base mount assembly includes a covering means that is adaptable to cover the at least one tightening means on the elevated seal portion for providing waterproof sealing between the base mount assembly and the roof structure.

5. The rail-less roof mounting system of claim 1 wherein the clamp member and the plate member are attached to the track utilizing at least one securing means that is slid through the horizontal groove and inserted through the plurality of apertures and the plurality of slots.

6. The rail-less roof mounting system of claim 1 wherein the clamp member interlocks top and bottom surfaces of the frame members of the plurality of PV modules.

7. The rail-less roof mounting system of claim 1 wherein the base member is made from an aluminum flashing.

8. A rail-less roof mounting system for installing a plurality of PV modules on a roof structure, the rail-less roof mounting system comprising:
a base mount assembly attached to the roof structure comprising:
a base member having a top surface and a bottom surface, the bottom surface being engaged with the roof structure, the base member having a waterproof means on the top surface thereof;
a block slider having an elevated seal portion and a vertical engaging portion, the elevated seal portion, having a borehole formed therethrough to receive the waterproof means, engages with the base member and the roof structure, utilizing at least one tightening means that is inserted through the borehole, the vertical engaging portion having a vertical groove along the surface thereof;
a top slider having a top portion and a bottom portion, the top slider having a track with a horizontal groove at the top portion, and a sliding seal member with a sliding groove and a slot at the bottom portion, the sliding seal member slides over the vertical engaging portion through the sliding groove and secured utilizing at least one fastening means that is inserted through the vertical groove on the vertical engaging portion and the slot on the sliding seal member of the top slider; and a covering means being adaptable to cover the at least one tightening means on the elevated seal portion; and a clamp assembly attached to the base mount assembly having a clamp member with a plurality of apertures on an inner surface and a plate member with a plurality of slots, the clamp member and the plate member being attached with the track utilizing at least one securing means that being slid through the horizontal groove and inserted through the plurality of apertures and the plurality of slots, the clamp member interconnects a frame member of a PV module to a frame member of an adjacent PV module;

whereby the plurality of PV modules are interlocked in a way to provide a corner-to-corner coupling arrangement which enables the connection of PV module corners to adjacent PV module corners by sandwiching above and beneath frame members of the plurality of PV modules.

9. The rail-less roof mounting system of claim 8 wherein the base mount assembly includes a plurality of wire clips for holding/retaining one or more wires from/for each PV module that is mounted to a building surface by the clamp assembly.

10. The rail-less roof mounting system of claim 8 is easily disassembled and stored when not in use.

11. The rail-less roof mounting system of claim 8 is configured to adjust mounting height of the rail-less roof mounting system by adjusting the position of the top slider along the vertical engaging portion.

12. The rail-less roof mounting system of claim 8 allows a snap-fit engagement to provide a longer landing ability to the plate member when installing the rail-less roof mounting system with a PV array skirt.

13. The rail-less roof mounting system of claim 8 provides a single grounding lug for assembling the PV array consisting of 300 PV modules.

14. The rail-less roof mounting system of claim 8 wherein the at least one tightening means is a structural screw.

15. The rail-less roof mounting system of claim 8 wherein the at least one fastening means is a cap screw.

16. The rail-less roof mounting system of claim 8 wherein the at least one fastening means is securely tightened utilizing a lock nut.

17. The rail-less roof mounting system of claim 8 wherein the at least one securing means is a cap screw.

18. The rail-less roof mounting system of claim 8 wherein the at least one securing means is securely tightened utilizing a lock nut.

19. The rail-less roof mounting system of claim 8 wherein the clamp member is attached with the frame members of the plurality of PV modules by inserting a plurality of screws into a plurality of holes on the clamp member.

20. A method for installing a plurality of photovoltaic (PV) modules on a roof structure, the method comprising the steps of:

a) providing a rail-less roof mounting system comprising:
a base mount assembly attached to the roof structure including a base member having a waterproof means on a top surface thereof, a block slider having an elevated seal portion with a borehole and a vertical engaging portion with a vertical groove along a surface thereof and a top slider having a track with a horizontal groove at a top portion, and a sliding seal member with a sliding groove and a slot at a bottom portion and a clamp assembly having a clamp member and a plate member;

b) placing the base member on the roof structure;

c) placing the block slider on the base member by inserting the waterproof means through the borehole on the elevated seal portion;

d) securing the block slider and the base member with the roof structure utilizing at least one tightening means that is inserted through the borehole and the waterproof means;

e) sliding the sliding seal member over the vertical engaging portion through the sliding groove on the top slider;

f) attaching the top slider to the block slider utilizing at least one fastening means that is inserted through the vertical groove on the vertical engaging portion and the slot on the top slider;

g) tightening the at least one fastening means utilizing a lock nut;

h) attaching the clamp member and the plate member with the track of the top slider utilizing at least one securing means that is slid through the horizontal groove and inserted through the plurality of slots on the plate member and a plurality of apertures on clamp member;

i) tightening the at least one securing means utilizing the lock nut;

j) interconnecting a frame member of a PV module to a frame member of adjacent PV module by the clamp member to provide a corner-to-corner coupling arrangement; and k) attaching the clamp member with the frame member of the PV module by inserting a plurality of screws into a plurality of holes on the clamp member;

whereby the corner-to-corner coupling arrangement enables the connection of PV module corners to adjacent PV module corners by sandwiching above and beneath frame members of the plurality of PV modules.

21. The method of claim 20 wherein the top slider is arranged along the vertical engaging portion to adjust height of mounting of the rail-less roof mounting system.

22. The method of claim 20 wherein the at least one tightening means is a structural screw.

23. The method of claim 20 wherein the at least one tightening means is attached along with a sealing washer that is adapted to seal the borehole in the elevated seal portion through which the at least one tightening means is fitted to prevent seepage of water.

24. The method of claim 20 wherein the at least one fastening means is a cap screw.

25. The method of claim 20 wherein the at least one securing means is a cap screw.

\* \* \* \* \*